United States Patent [19]
Joo et al.

[11] Patent Number: 6,027,255
[45] Date of Patent: Feb. 22, 2000

[54] BIDIRECTIONAL OPTICAL COMMUNICATION MODULE USING SINGLE OPTICAL FIBER

[75] Inventors: Gwan Chong Joo; Ki Sung Park; Sang Hwan Lee; Seung Goo Kang; Min Kyu Song; Hong Man Kim, all of Daejeon, Rep. of Korea

[73] Assignees: Electronics and Telecommunications Research Institute, Daejeon; Korea Telecom, Seoul, both of Rep. of Korea

[21] Appl. No.: 09/137,319

[22] Filed: Aug. 20, 1998

[30] Foreign Application Priority Data

Dec. 22, 1997 [KR] Rep. of Korea ............. 97-71650

[51] Int. Cl.⁷ .................................. G02B 6/36
[52] U.S. Cl. ............................. 385/88; 359/122
[58] Field of Search ............... 385/88–94, 147, 385/4–14, 15; 359/122, 110, 114, 127, 497, 500, 341, 124, 333, 173; 372/6, 45, 96, 21, 22, 23, 43, 50

[56] References Cited

U.S. PATENT DOCUMENTS

| | | |
|---|---|---|
| 3,892,470 | 7/1975 | Lotspeich ..................... 359/497 |
| 4,730,330 | 3/1988 | Plihal et al. . |
| 4,825,113 | 4/1989 | Sato et al. ..................... 359/122 |
| 4,869,579 | 9/1989 | Fischer et al. ................. 372/21 |
| 4,955,014 | 9/1990 | Kuppers et al. ............... 359/116 |
| 5,144,637 | 9/1992 | Koch et al. . |
| 5,239,189 | 8/1993 | Lawrence . |
| 5,309,275 | 5/1994 | Nishimura et al. ............ 359/344 |
| 5,400,419 | 3/1995 | Heinen . |
| 5,677,786 | 10/1997 | Meli ............................. 359/341 |
| 5,920,588 | 7/1999 | Watanabe ..................... 372/96 |

OTHER PUBLICATIONS

W. Metzger et al., "Photonic Integrated Transceiver for the Access Network", ECOC 1994, 20th European Conference on Optical Communication, pp. 87–90.

Naoto Uchida et al., "Low–Cost Hybrid WDM Module Consisting of a Spot–Size Converter Integrated Laser Diode and a Waveguide Photodiode on a PLC Platform for Access Network Systems", IEICE Trans. Electron., vol. E80–C, No. 1, Jan. 1997, pp. 88–98.

G.M. Foster, J.R. et al., "OEIC WDM transceiver modules for local access networks", Electronics Letters, Jan. 19, 1995, vol. 31, No. 2, pp. 132–133.

Primary Examiner—Akm E. Ullah
Attorney, Agent, or Firm—Jacobson, Price Holman & Stern PLLC

[57] ABSTRACT

A bidirectional optical communication module using a single optical fiber is disclosed. The module includes an optical fiber having a cut-away surface polished to have an acute angle between the cut-away surface and an axis of the optical fiber, a semiconductor laser emitting a transmission light coupled with a light fiber core, and a bidirectional optical device having a light receiving portion absorbing a receiving light outputted from the light fiber core for thereby optically coupling a bidirectional optical device in which a light receiving device is integrated into a light transmitting semiconductor laser as a single chip and an optical fiber when fabricating an optical module for implementing a light signal transmission and receiving operation using one optical fiber.

17 Claims, 3 Drawing Sheets

BIDIRECTIONAL OPTICAL COMMUNICATION MODULE USING SINGLE OPTICAL FIBER

BACKGROUND OF THE INVENTION

1. Field of the Invention

The present invention relates to a bidirectional optical communication module using a single optical fiber, and in particular, to an improved bidirectional optical communication module using a single optical fiber which is capable of significantly improving an optical coupling operation between a bidirectional optical device into which a light receiving device is integrated into a light receiving semiconductor laser in a form of a single chip and an optical fiber.

2. Description of the Conventional Art

The optical communication module for an optical communication is divided into a transmission module and a receiving module for thereby implementing a transmitting and receiving operation using additional optical fiber. Recently, an optical transmission/receiving module in which an optical transmission portion and receiving portion are integrated into one package has been intensively studied. In this case, additional optical fiber is used. When only one optical fiber is used for thereby implementing a transmission and receiving operation instead of using additional optical fiber, the cost for installing the optical fiber is decreased. Therefore, it is possible to decrease the number of system parts for thereby economically implementing the optical communication system.

The optical transmission and receiving operations have been performed using one optical fiber. In order to implement a bidirectional optical communication which is capable of transmitting a transmission and receiving signal at the same time using one optical fiber, the bidirectional optical transmission/receiving module includes a Y-shaped light splitting waveguide device for splitting one optical signal into two parts, a semiconductor device, and a light receiving device. In the light splitting waveguide device, the waveguide portion is coupled with the optical fiber, and the semiconductor laser and the light receiving device are coupled after the light signal is split.

The light from the semiconductor laser is coupled with the light splitting waveguide device and advances along the waveguide and is coupled with the optical fiber the Y-shaped light splitting point and a common waveguide. The light inputted from the optical fiber is coupled with the common waveguide and advances and is split at the Y-shaped light splitting point. A part of the light advanced in the direction of the waveguide coupled with the light receiving device is coupled with the light receiving device for thereby detecting the light signal.

However, in this method, the semiconductor optical device and the optical fiber are coupled at both sides of the waveguide splitting device and then the light signal is split by the Y-shaped splitting point, so that a light advancing loss is decreased, and thus the light output and light receiving sensitivities are decreased. The devices are separately fabricated, and the optical coupling is implemented through an accurate optical alignment packaging process, so that the fabrication cost is increased, and it is impossible to fabricate a compact size product.

In order to overcome the problems that many parts and a multiprocess optical alignment packaging process are used, a method for integrating the semiconductor laser, light receiving device and light splitting waveguide device onto one substrate using a semiconductor process is disclosed. The integrated device has an excellent characteristic rather than when the devices are separately used. In addition, when aligning the optical fibers, it is possible to fabricate a desired waveguide for thereby simplifying the packaging process.

However, since the above-described method uses a light splitting waveguide, it is impossible to overcome the light loss and fabricate a small size product. In addition, since three kinds of optical devices having different structures and fabrication processes are integrated onto the identical semiconductor substrate as a single chip, it is very difficult to fabricate the integrated chip. In addition, it is impossible to obtain a high yield by optimizing the structure having a maximum characteristic.

There is another method for implementing a transmission and receiving operation of an optical signal having the identical wavelength using one optical fiber. In this method, a thin film filter surface has a 45° inclination with respect to the axis of the optical fiber, and the semiconductor laser is installed behind the filter on the axis of the optical fiber, and the light receiving device is positioned at an by angle of 90° with respect to the axial direction of the optical fiber above the filter.

The light from the semiconductor laser passes through the filter and is coupled with the optical fiber. In addition, the receiving light signal from the optical fiber is reflected at an angle of 90° by the filter and is coupled with the light receiving device. In this case, the principle is simple but each optical device should be separately fabricated. The filter is bulky, and the packaging process for the filter and optical device alignment is complicated. The light coupling loss is increased because the light coupling distance is extended for thereby decreasing the light output and receiving strength.

In order to overcome the above-described problems, one optical fiber is used for thereby implementing a transmission and receiving operation instead of additionally using optical fiber, so that it is possible to decrease the fabrication cost of the optical fiber. Therefore, the number of parts is decreased, so that more economical optical communication is implemented. However, the system is made bulky and the number of parts is increased. In addition, it is difficult to fabricate a desired module. In the case when a single wavelength is used, an apparatus should be additionally used for eliminating any effects of the transmission and receiving light affecting the light receiving device. In order to be adaptable to the communication of a high density light wavelength splitting method, the optical device is separately fabricated, and the package structure is complicated for thereby increasing the fabrication cost.

SUMMARY OF THE INVENTION

Accordingly, it is an object of the present invention to provide a bidirectional optical communication module using a single optical fiber which overcomes the aforementioned problems encountered in the conventional art.

It is another object of the present invention to provide a bidirectional optical communication module using a single optical fiber which is capable of significantly improving an optical coupling method between a bidirectional optical device into which a light receiving device is integrated into a light receiving semiconductor laser in a form of a single chip and an optical fiber.

It is another object of the present invention to provide a bidirectional optical communication module using a single optical fiber which is capable of optically coupling a bidirectional optical device in which a light receiving device is integrated into a light transmitting semiconductor laser as a single chip and an optical fiber when fabricating an optical module for implementing a light signal transmission and receiving operation using one optical fiber.

In order to achieve the above objects, there is provided a bidirectional optical communication module using a single optical fiber according to a first embodiment of the present invention which includes an optical fiber having a cut-away surface polished to have an acute angle between the cut-away surface and an axis of the optical fiber, a semiconductor laser emitting a transmission light coupled with a light fiber core, and a bidirectional optical device having a light receiving portion absorbing a receiving light outputted from the light fiber core.

In order to achieve the above objects, there is provided a bidirectional optical communication module using a single optical fiber according to a second embodiment of the present invention which includes a light receiving device formed by integrating a monitor photodiode into a bidirectional optical device integrated into a semiconductor laser, an optical fiber having a cut-away surface polished so that a transmission light emitted from the semiconductor laser during a light coupling is coupled with an optical fiber core and a receiving light outputted from the optical fiber core is condensed at a light receiving portion of the bidirectional optical device for thereby implementing a bidirectional optical communication using a single optical fiber, and a reflection member for reflecting the light outputted from the back side of the semiconductor laser for thereby coupling the thusly emitted light and the monitor photodiode integrated into the bidirectional optical device.

Additional advantages, objects and other features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

BRIEF DESCRIPTION OF THE DRAWINGS

Figure 1:
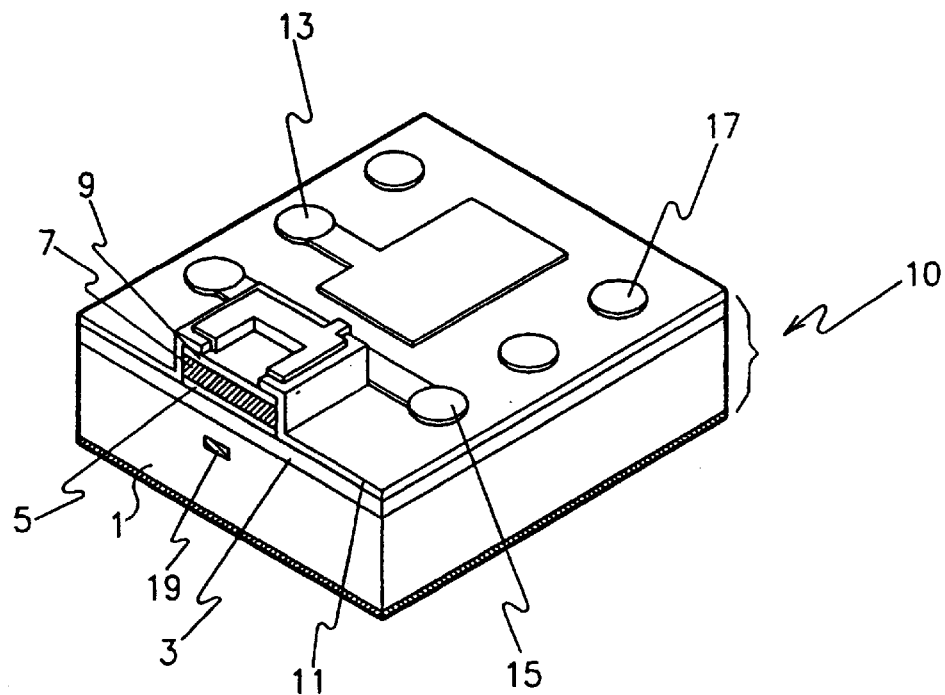
Figure 2:
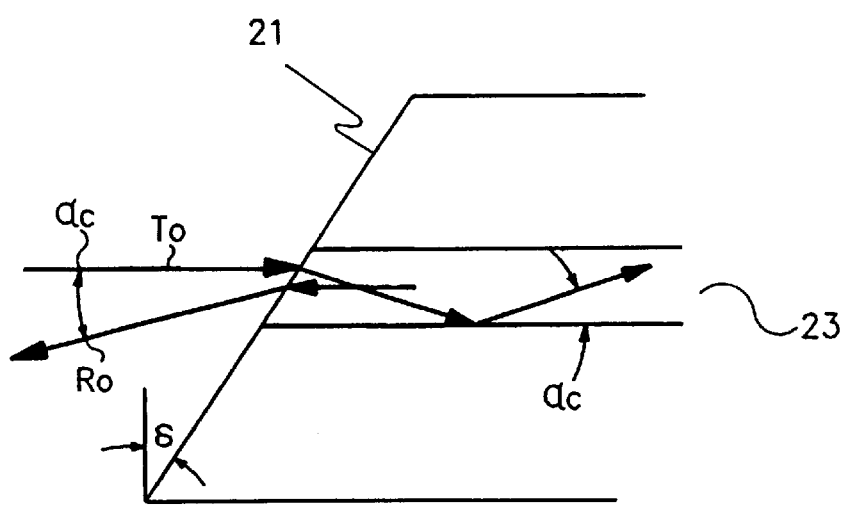
Figure 3A:
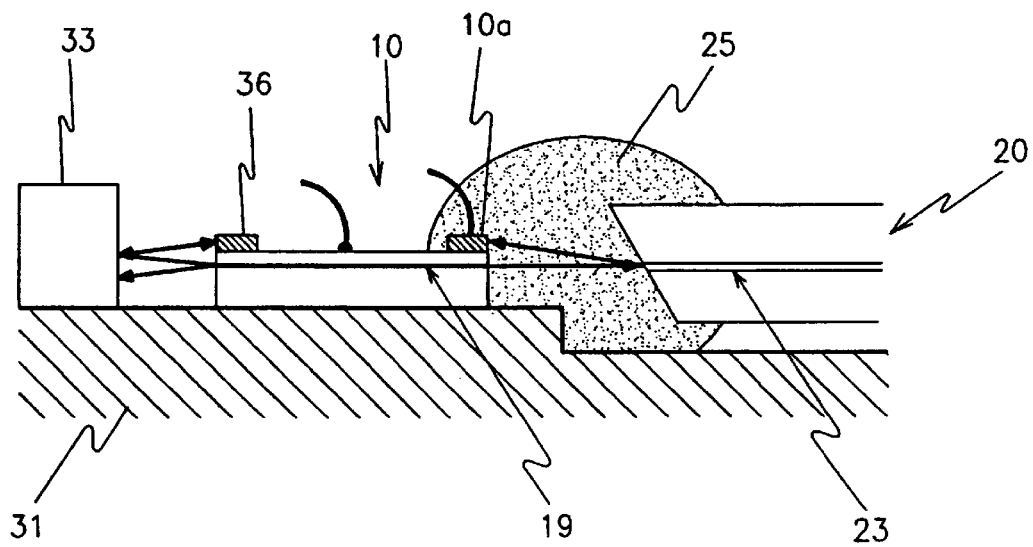
Figure 3B:
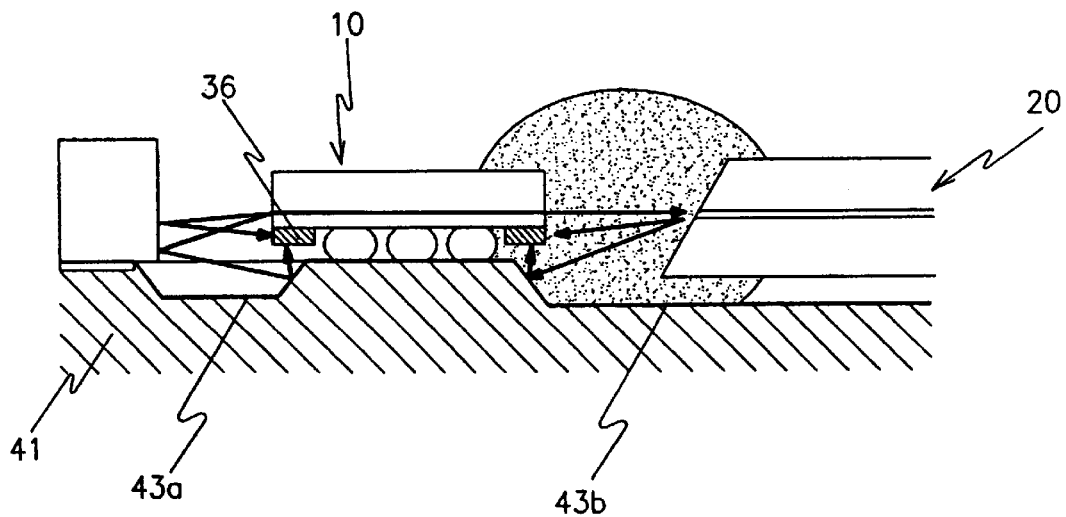
Figure 4:
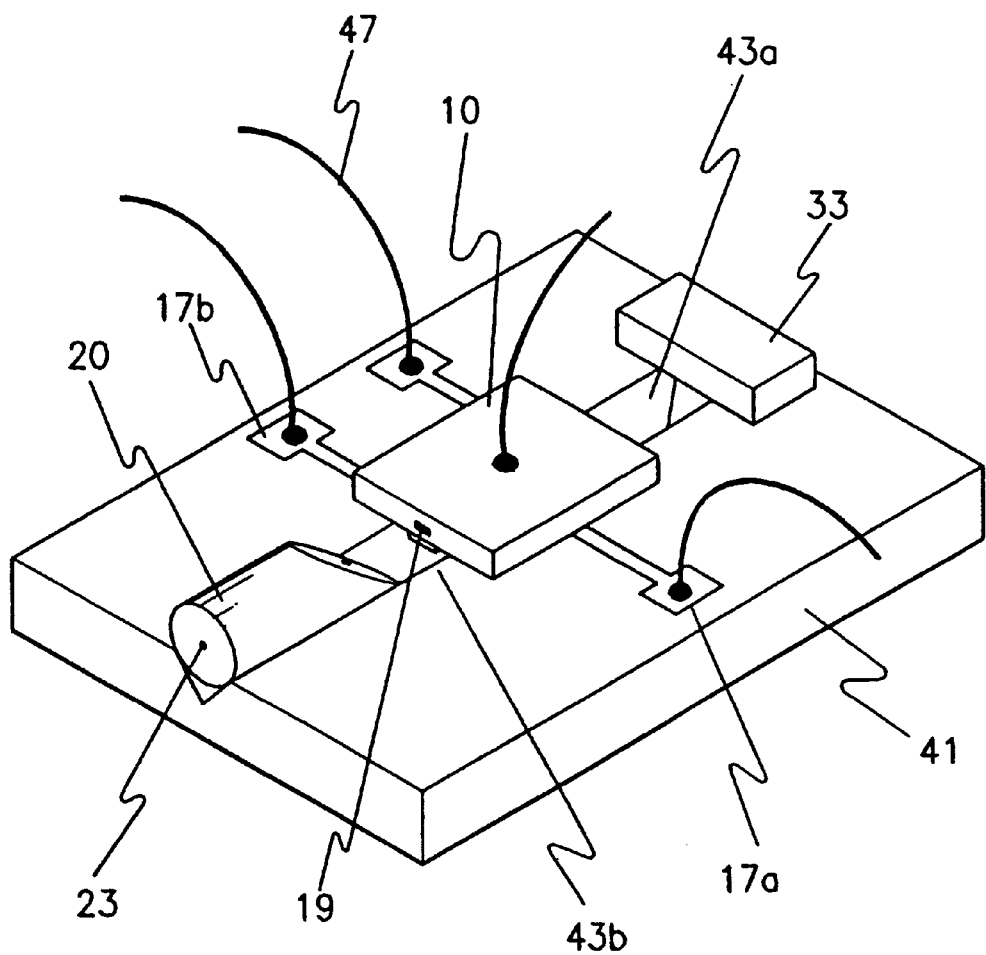

FIG. 1 is a perspective view illustrating the construction of a bidirectional light device in which a light receiving device is integrated into a semiconductor laser according to the present invention;

FIG. 2 is a view illustrating an input/output principle of an optical signal for an optical fiber having an acute angle cross section according to the present invention;

FIG. 3A is a cross-sectional view illustrating an optical device module into which a bidirectional optical device into which a monitor photodiode is integrated and an optical fiber are mounted by an active alignment method according to the present invention;

FIG. 3B is a cross-sectional view illustrating an optical device module into which a bidirectional optical device into which a monitor photodiode is integrated and an optical fiber are mounted by a passive alignment method according to the present invention; and FIG. 4 is a perspective view illustrating an optical device module having a substrate onto which a bidirectional optical device into which a monitor photodiode is integrated is mounted by a passive alignment method.

DETAILED DESCRIPTION OF THE INVENTION

The bidirectional optical device according to the present invention is formed by stacking a light receiving de vice on a semiconductor laser formed on a n-type semiconductor substrate. At this time, a p-type semiconductor layer formed between the semiconductor laser and the light receiving device has the identical layer. Namely, the bidirectional optical device according to the present invention is formed of a n-p-n structure.

As one of the fabrication examples of the bidirectional optical device, the structure in which a planar buried heterostructure laser diode and an InHaAs light receiving device are integrated on the identical substrate will be explained with reference to FIG. 1.

The InP group semiconductor laser is generally fabricated by a crystal growth method such as a metal organic chemical vapor deposition or a liquid phase epitaxy in accordance with a predetermined semiconductor laser fabrication process.

Namely, an undoped InP layer 5, an undoped InGaAs light absorbing layer 7, and a n-type InP layer 9 are sequentially grown on a semiconductor laser diode formed of a substrate 1 having a waveguide 19 and a p-InGaAs epitaxial layer 3. The thusly grown resultant structure is selectively etched except for the light receiving region.

At this time, the monitor photodiode which detects an optical output of the semiconductor laser may be integrated. In this case, the monitor photodiode is formed opposite the light receiving device on the waveguide of the semiconductor laser. When etching the light receiving region, the monitor photodiode region may be defined and etched at the same time. In addition, the light receiving device, a light absorbing window region of the monitor photodiode and an electrode are defined. The semiconductor laser from the p-type InGaAs 3 formed of a resistive contact, a common electrode 13 (the identical common electrode is sued when integrating the monitor photodiode) of the light receiving device, and a n-type common electrode 15 (the n-electrode is formed when integrating the monitor photodiode) of the light receiving device from the n-type InP layer 9 are formed respectively for thereby completing the wafer front side formation process.

At this time, an additional flip-chip bonding pad 17 may be formed except for the electrode pad for stabilizing a mechanical stability of the bonded chip. The back side surface of the wafer is polished to a predetermined thickness. A back side electrode of the semiconductor laser is formed by depositing a metallic material resistance-contacting with the n-type InP substrate 1, and then the resultant structure is divided into the unit chips by cleaving the same, so that the bidirectional optical device chip 10 (an integration type bidirectional optical device chip when integrating the monitor photodiode) is fabricated.

The bidirectional optical device 10 is mounted for an optical coupling with the optical fiber. The input/output principle of the optical signal for the optical fiber coupled with the optical device will be explained with reference to FIG. 2.

As shown therein, the transmission light (To) emitted from the semiconductor laser is reflected on the surface of the optical fiber 20. Thereafter, the light is absorbed by the light receiving device. In order to prevent undesired information, the angle between the cut-away surface of the optical fiber and the axis of the optical fiber is polished to have an acute angle. More preferably, the same may be polished to have a conical shape.

When the optical fiber which is polished to be planar and acute is coupled with the bidirectional optical device, or when the optical signal advances from the air into the optical fiber or vice versa, the advancing direction of the optical signal is changed due to the refractive index difference between the air ($n_1$=1) and the optical fiber ($n_2 \approx 1.5$) in accordance with the Snell's rule ($n_1 \sin \theta_1 = n_2 \sin \theta_2$, where $n_1$ and $n_2$ represent the refractive index of the medium 1 and 2, and $\theta_1$ and $\theta_2$ represent the angle between the direction of the input/output light and the cut-away surface of the optical fiber).

The thusly changing direction of light may affect the optical coupling between the semiconductor laser and the light receiving device. Therefore, the polishing angle $\delta$ of the optical fiber should be actually computed. Namely, the refractive index difference between the core 23 of the optical fiber 20 and the clad layer surrounding the same is about 0.003~0.005. This represents that the maximum reflection angle $\alpha_c$ that the transmission light (To) advanced into the core in the parallel direction with the direction of the core 23 through the air is fully reflected and advances along the optical fiber is limited to about 5~6°. Therefore, the maximum polishing angle $\delta$ of the optical fiber with respect to the incident light should be within 10~11°, so that it is possible to obtain an optical power which is needed for a remote communication based on the optical coupling between the transmission light of the semiconductor laser and the optical fiber which light is parallel to the optical fiber direction.

When coupling the optical fiber 20 and the light receiving device, since the light receiving device is stacked on the semiconductor laser, the receiving light Ro outputted from the optical fiber in a range in which the optical coupling of the semiconductor laser and the optical fiber are not affected is focused onto the light receiving window of the light receiving device. The acute portion of the optical fiber is positioned in the direction of the light receiving device, so that it is possible to prevent the transmission light from any reflection, and the receiving light Ro parallely advancing in the direction of the optical fiber is toward the light receiving device thereby obtaining an effective optical coupling.

If the optical coupling medium is the air, and ½ of the semiconductor laser diffusion angle is larger than the maximum polishing angle $\delta$ of the optical fiber 20, the transmission light To reflected on the surface of the optical fiber may be absorbed into the light receiving device. At this time, if the power of the light absorbed is within the range of the receiving sensitivity (over −40 dBm) of the light receiving device, the reflected transmission light To is mixed with the receiving light Ro for thereby causing error receiving. Therefore, the transmission and receiving light should be restricted on the surface of the optical fiber (the monitor photodiode uses the maximum reflection). When computing based on the Full Width at Half Maximum (FWHM) of the semiconductor laser diffusion, the polishing angle $\delta$ of the optical fiber should exceed 30°, so that it is possible to prevent any effects of the transmission/receiving light reflection having the light receiving device sensing range.

If the polishing angle of the optical fiber exceeds the maximum polishing angle, the light is made incident parallely to the direction of the optical fiber, so that the changing direction of the transmission light To of the semiconductor laser exceeds the angle of $\alpha_c$ of the full reflection of the optical fiber core 23. Therefore, it is impossible to obtain a desired optical power needed for the remote light transmission. In this case, the above-described problems are overcome by adjusting the reflection rate of the optical coupling medium for thereby implementing a desired optical coupling.

More preferably, a silicon gel, etc. may be used as an optical coupling medium in stead of using the air. For example, if the FWHM of the semiconductor laser having an output power of 5 mW is 30°, the polishing angle of the optical fiber should be 35°, so that it is possible to prevent the transmitting light reflected on the surface of the optical fiber affecting the light receiving device. At this time, it is possible to obtain an output power of light enough for the remote communication and a receiving effect using a control medium (reference numeral 25 in FIG. 3A) having a refractive index of about 1.3.

When mounting the bidirectional optical device and optical fiber using the above-described light coupling principle, the active alignment method or passive alignment method is used. The above-described light coupling method will be explained with reference to FIG. 3A and FIG. 3B.

In the active alignment method as shown in FIG. 3A, the integrated laser diode 10 is die-bonded on the substrate 31 made of a diamond or alumina, etc. The optical fiber core 23 and the laser diode waveguide 19 are aligned and fixed, so that the maximum light coupling is implemented by driving the laser diode 10 for thereby fabricating an optical module.

At this time, the optical fiber 20 is polished to have a predetermined angle, and the acute portion of the same faces toward the light receiving device. If necessary, the portion between the optical device and the optical fiber 20 is filled using the refractive index control medium 25 such as a silicon gel, etc. In the case of the integrated bidirectional light device, the reflection member 33 is formed perpendicularly to the direction of the waveguide 19 in the direction of the monitor photodiode 36.

Electric power is applied to the p-type common electrode 13 and the back side electrode of the semiconductor laser for thereby oscillating the semiconductor laser 10, so that light is emitted at both sides of the waveguide 19 of the semiconductor laser. At this time, the transmission light To which is forwardly emitted is coupled with the optical fiber core 23 and the light which is emitted toward the monitor photodiode 36 is reflected by the reflection member 33, absorbed into a light absorbing layer 7 as shown in FIG. 1 of the monitor photodiode 36, and changed to the current component. The thusly generated current component is detected by an external circuit through the p-type common electrode 13 and the n-electrode of the monitor photodiode 36.

In addition, the receiving light Ro from the optical fiber 20 is refracted toward the light receiving device 10a due to the refractive difference between the optical fiber 20 and the light coupling medium 25, absorbed into the light absorbing layer 7 of the light receiving device 10 and changed to the current component. The thusly generated current component is detected by an external current the p-type common electrode 13 to which a reverse bias voltage is applied and the n type electrode of the light receiving device.

Next, the light coupling principle of the bidirectional optical device when coupling the optical device and optical fiber based on the passive alignment method will be explained with reference to FIG. 3B.

In a state that the surface of the bidirectional optical device 10 facing toward the light device 10a is aligned toward the downward direction, the bidirectional optical device 10 is flipchip-bonded on the passive alignment substrate 41. The acute portion of the optical fiber 20 is aligned to face toward the light receiving device 10a and then is aligned on the optical fiber alignment V-groove 43b. If necessary, the portion between the optical device and the optical fiber 20 is filled by the refractive index control medium 25.

The position of the flipchip bonding pad formed on the passive alignment substrate 41 and the width of the V-groove are adjusted so that the waveguide 19 and the optical fiber core 23 are aligned. Since the light receiving device 10a is capable of receiving light on its cut-away surface as well as its surface, the receiving light from the optical fiber core 23 is directly absorbed into the cut-away surface of the light receiving device 10a, and the light reflected on the cross-sectional surface of the V-groove 43b on the lower side substrate of the light receiving device is also absorbed thereinto, so that it is possible to enhance more the light coupling efficiency of the light receiving device in the passive alignment method compared to the active alignment method.

At this time, in order to increase the reflection rate of the V-groove 43b, the surface of the V-groove 43b is deposited with a metal such as Au. A solder bump 45 is used for the flip chip bonding. More preferably, a metal such as Au may be used.

In the case of the integrated bidirectional optical device, the reflection member 33 is mounted on the back side of the monitor photodiode 36 in the same manner as the active alignment. In the monitor photodiode 36, since the light receiving operation is implemented by the cut-away surface as well as the surface, the light reflection V-groove 43a is formed in the direction of the substrate below the monitor photodiode 36, so that the light directly reflected by the reflection member 33 is absorbed by the cut-away surface of the monitor photodiode and then the light secondarily reflected by the V-groove 43a is absorbed by the surface for thereby increasing the optical coupling efficiency.

At this time, in order to increase the reflection rate of the V-groove 43a, the surface of the V-groove 43a is deposited with a metal such as Au. In order to prevent the reflected light from being reversely absorbed into the waveguide 19, the reflection surface of the reflection member 33 perpendicular to the waveguide 19 is formed to have a diffusion angle of $\alpha_h/2$ which is larger than ½ of the maximum diffusion angle $(\alpha_h)$ in the vertical direction of the semiconductor laser, so that the light reflected by the reflection member 33 is not reflected toward the cut-away surface of the bidirectional optical device, whereby the light is absorbed into the surface of the monitor photodiode through the light reflection V-groove 43a.

The optical module will be explained with reference to FIG. 4.

The semiconductor laser is oscillated by supplying current to the wire bonding pad 17a connected with the p-type common electrode and the back side electrode of the semiconductor laser. At this time, the light forwardly emitted toward the semiconductor laser is coupled with the optical fiber core 23 aligned on the V-groove 43b through the light coupling medium. The receiving light from the optical fiber 20 is diffracted toward the light receiving device by the refractive index difference between the optical fiber and the optical coupling medium and then is absorbed into the light absorbing layer 7 of the light receiving device and is changed to the current component. The thusly changed current component is outputted to the outside through the p-type common electrode 13 to which the reverse bias voltage is applied and the n-electrode 15 of the light receiving device and is detected by an external circuit.

In the integrated bidirectional optical device, the light emitted toward the back side of the semiconductor laser 10, namely, toward the monitor photodiode 36 is reflected by the reflection member 33 and is absorbed into the light absorbing layer of the monitor photodiode 36 through the light reflection V-groove 43a and is changed to the current component. The thusly changed current component is outputted through the wire bonding pad connected with the p-type common electrode 13 to which the reverse bias voltage is applied and the n-electrode of the monitor photodiode 36 and then is detected by an external circuit.

As described above, in the present invention, any effects of the cross-sectional reflection of the optical fiber of the transmission light emitted from the semiconductor laser when coupling the semiconductor laser and the optical fiber are eliminated by integrating the light transmission semiconductor laser and the light receiving device into a single chip and using the optical fiber polished to have an acute angle surface and a refractive rate control medium. In addition, it is possible to maintain a light coupling efficiency of the transmission light, maximizing the coupling efficiency of the receiving light and minimizing the cost, so that it is possible to implement a bidirectional communication without any changes of the package structure during the packaging process of the wavelength splitting optical device array.

In addition, when mounting the light receiving device on the semiconductor laser, in order to stably maintain the optical output of the semiconductor laser, it is possible to easily integrate the monitor photodiode. The light outputted from the back side of the integrated bidirectional optical device bonded on the substrate when fabricating the integrated bidirectional optical device is effectively coupled with the monitor photodiode integrated into the bidirectional optical device by using a reflection member, so that the light coupling structure of the optical device into which the semiconductor laser, the light receiving device and the monitor photodiode are integrated is simplified and minimized for thereby decreasing the difficulty of the packaging process and the cost required for fabricating and mounting the monitor photodiode. Furthermore, it is possible to easily implement the monitor photodiode without changing the packaging structure when packaging the semiconductor laser.

Although the preferred embodiments of the present invention have been disclosed for illustrative purposes, those skilled in the art will appreciate that various modifications, additions and substitutions are possible, without departing from the scope and spirit of the invention as recited in the accompanying claims.

What is claimed is:

1. In a bidirectional optical communication module using a bidirectional optical device in which a laser diode having a waveguide and a light receiving device are integrated on the identical substrate and a single optical fiber in which an optical fiber is coupled to an active alignment substrate, the improved bidirectional optical communication module comprising:

an optical fiber having a cut-away surface polished to have an acute angle between the cut-away surface and an axis of the optical fiber;

a semiconductor laser emitting a transmission light coupled with a light fiber core; and a bidirectional optical device having a light receiving portion absorbing a receiving light outputted from the light fiber core.

2. The module of claim 1, wherein in said module, a portion between the light coupled bidirectional optical device and an optical fiber having a polished cross section is filled with a medium except for the air.

3. The module of claim 2, wherein said refractive index of the medium is different from the refractive index of the optical fiber and varies the angles of a transmission light concentrated on the optical fiber and a receiving light outputted from the optical fiber.

4. The module of claim 1, wherein said optical fiber is polished to have a conical shape in which a core portion is protruded by sharpening a center portion of the optical fiber.

5. The module of claim 4, wherein in said module, a portion between the light coupled optical device and the conical shape optical fiber is filled with a medium except for the air.

6. The module of claim 1, wherein in said module, the bidirectional optical device is die-boned on a substrate made of a diamond or alumina, and an acute angle portion of the optical fiber faces toward the light receiving device by driving the laser diode for thereby aligning the optical fiber core and a waveguide for implementing a maximum light coupling, and the light forwardly from the waveguide of the semiconductor laser when oscillating the semiconductor laser by applying a current to a p-type common electrode of the optical module and a n-electrode of the semiconductor laser and the light outputted from the optical fiber coupled with the optical fiber core is absorbed into an optical absorbing layer of the light receiving device.

7. The module of claim 1, wherein said module is formed by coating the surface of the reflection member with a metal.

8. The module of claim 8, wherein in said module, the bidirectional optical device has a surface formed in the direction of the light receiving device and being faced downwardly for thereby flipchip-bonding on a passive alignment substrate, and an acute angle portion of the optical fiber faces toward the light receiving device for thereby aligning on the optical fiber alignment V-groove, and the transmission light of the semiconductor laser waveguide emitted by oscillating the semiconductor laser is coupled with the optical fiber core, and the receiving light from the optical fiber is absorbed into the light receiving device.

9. The module of claim 8, wherein a light reflection V-groove is formed on the surface below the monitor photodiode in the direction of the reflection member.

10. The module of claim 9, wherein said a surface of the light reflection V-groove is coated with a metal.

11. The module of claim 8, further comprising a flipchip bonding pad except for an electrode for an operation of the optical device.

12. The module of claim 8, wherein a wire bonding pad is formed on the substrate on which an optical device is flipchip-bonded.

13. A bidirectional optical communication module using a single optical fiber, comprising:
a light receiving device formed by integrating a monitor photodiode into a bidirectional optical device integrated into a semiconductor laser;
an optical fiber having a cut-away surface polished so that a transmission light emitted from the semiconductor laser during a light coupling is coupled with an optical fiber core and a receiving light outputted from the optical fiber core is condensed at a light receiving portion of the bidirectional optical device for thereby implementing a bidirectional optical communication using a single optical fiber; and
a reflection member for reflecting the light outputted from the back side of the semiconductor laser for thereby coupling the thusly emitted light and the monitor photodiode integrated into the bidirectional optical device.

14. The module of claim 13, wherein in said module, a portion between the light coupled bidirectional optical device and an optical fiber having a polished cross section is filled with a medium except for the air.

15. The module of claim 13, wherein in said module the bidirectional optical device into which the monitor photodiode is integrated is die-bonded on a substrate formed of a diamond or alumina, the reflection member formed of a silicon is mounted on a back side surface facing toward the monitor photodiode perpendicular to the direction of a waveguide of the semiconductor laser and is electrically connected with a circuit substrate based on a wire bonding method, and then the core of the optical fiber and the waveguide are aligned for thereby implementing a maximum light coupling, and a current is applied to the p-type common electrode of the optical module and the n-electrode of the semiconductor laser, so that the light emitted forwardly from the semiconductor laser waveguide when oscillating the semiconductor laser is coupled with the optical fiber core, and the light emitted in the direction of the monitor photodiode is absorbed into a light absorbing layer of the monitor photodiode for thereby absorbing the light emitted from the optical fiber into the light absorbing layer of the light receiving device.

16. The module of claim 13, wherein a surface of the integrated bidirectional optical device of the monitor photodiode downwardly faces toward the light receiving device and then a flip chip is bonded on a passive alignment substrate formed of a silicon, and a reflection member is mounted on a back side surface of the monitor photodiode, an acute angle portion of the optical fiber polished faces toward the light receiving device and then is aligned with the V-groove, and the light emitted forwardly from the semiconductor laser waveguide by oscillating the semiconductor laser is coupled with the optical fiber core, and the light emitted backwardly in the direction of the monitor photodiode is reflected by the reflection member and then is absorbed into the cross-sectional surface of the light absorbing layer of the monitor photodiode, and the light outputted from the optical fiber is absorbed into the light absorbing layer of the light receiving device.

17. The module of claim 13, wherein said module, a reflection surface of the reflection member perpendicular to the waveguide is formed to have a diffusion angle of $\alpha_h/2$ which is larger than ½ of the maximum diffusion angle ($\alpha_h$) in the vertical direction of the semiconductor laser, so that the light reflected by the reflection member is not reflected toward the cut-away surface of the bidirectional optical device, whereby the light is absorbed into the surface of the monitor photodiode through the light reflection V-groove.

* * * * *